US010807644B2

(12) United States Patent
Kondo

(10) Patent No.: US 10,807,644 B2
(45) Date of Patent: Oct. 20, 2020

(54) VEHICLE FRONT STRUCTURE

(71) Applicant: HONDA MOTOR CO., LTD., Tokyo (JP)

(72) Inventor: Takehiro Kondo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 50 days.

(21) Appl. No.: 16/023,463

(22) Filed: Jun. 29, 2018

(65) Prior Publication Data

US 2019/0009820 A1    Jan. 10, 2019

(30) Foreign Application Priority Data

Jul. 5, 2017   (JP) ................................ 2017-132046

(51) Int. Cl.
| | | |
|---|---|---|
| *B62D 21/15* | (2006.01) | |
| *B62D 21/02* | (2006.01) | |
| *B62D 25/16* | (2006.01) | |
| *B62D 25/08* | (2006.01) | |

(52) U.S. Cl.
CPC ........... *B62D 21/152* (2013.01); *B62D 21/02* (2013.01); *B62D 25/08* (2013.01); *B62D 25/163* (2013.01)

(58) Field of Classification Search
CPC .... B62D 21/152; B62D 25/163; B62D 21/02; B62D 25/08
See application file for complete search history.

(56) References Cited

U.S. PATENT DOCUMENTS

| | | | | |
|---|---|---|---|---|
| 8,727,428 | B2 * | 5/2014 | Takeuchi ............. | B62D 25/082 296/193.09 |
| 2009/0315311 | A1 | 12/2009 | Tamakoshi | |
| 2016/0244097 | A1 | 8/2016 | Kondo et al. | |
| 2017/0088180 | A1 | 3/2017 | Takeda et al. | |
| 2017/0313361 | A1 | 11/2017 | Watanabe et al. | |
| 2019/0276094 | A1 | 9/2019 | Kondo et al. | |
| 2020/0140015 | A1 | 5/2020 | Kondo et al. | |

FOREIGN PATENT DOCUMENTS

| | | |
|---|---|---|
| CN | 101600616 A | 12/2009 |
| CN | 109476348 A | 3/2019 |
| CN | 109476349 A | 3/2019 |
| CN | 109496191 A | 3/2019 |
| JP | 2009-196544 A | 9/2009 |

(Continued)

OTHER PUBLICATIONS

Japanese Office Action with English translation dated Feb. 26, 2019, 12 pages.

(Continued)

*Primary Examiner* — D Glenn Dayoan
*Assistant Examiner* — Melissa Ann Bonifazi
(74) *Attorney, Agent, or Firm* — Rankin, Hill & Clark LLP

(57) ABSTRACT

A side frame is arranged outward of a front side frame in a vehicle width direction. The side frame includes an upper member, and a lower member connected to a front end of the upper member and extending frontward and downward. An upper bent part bent frontward and upward is formed in a connection part between the upper member and the lower member. A bulkhead is provided frontward of the upper bent part so as to separate a closed cross section part of the lower member.

6 Claims, 6 Drawing Sheets

(56) References Cited

FOREIGN PATENT DOCUMENTS

| | | | |
|---|---|---|---|
| JP | 2009-255883 | A | 11/2009 |
| JP | 5640934 | B2 | 12/2014 |
| JP | 2016-150719 | A | 8/2016 |
| JP | 2017-065363 | A | 4/2017 |
| WO | 2016117252 | A1 | 7/2016 |

OTHER PUBLICATIONS

Office Action received in corresponding CN application No. 201810608951.5 dated Jul. 3, 2020 (7 pages).

\* cited by examiner

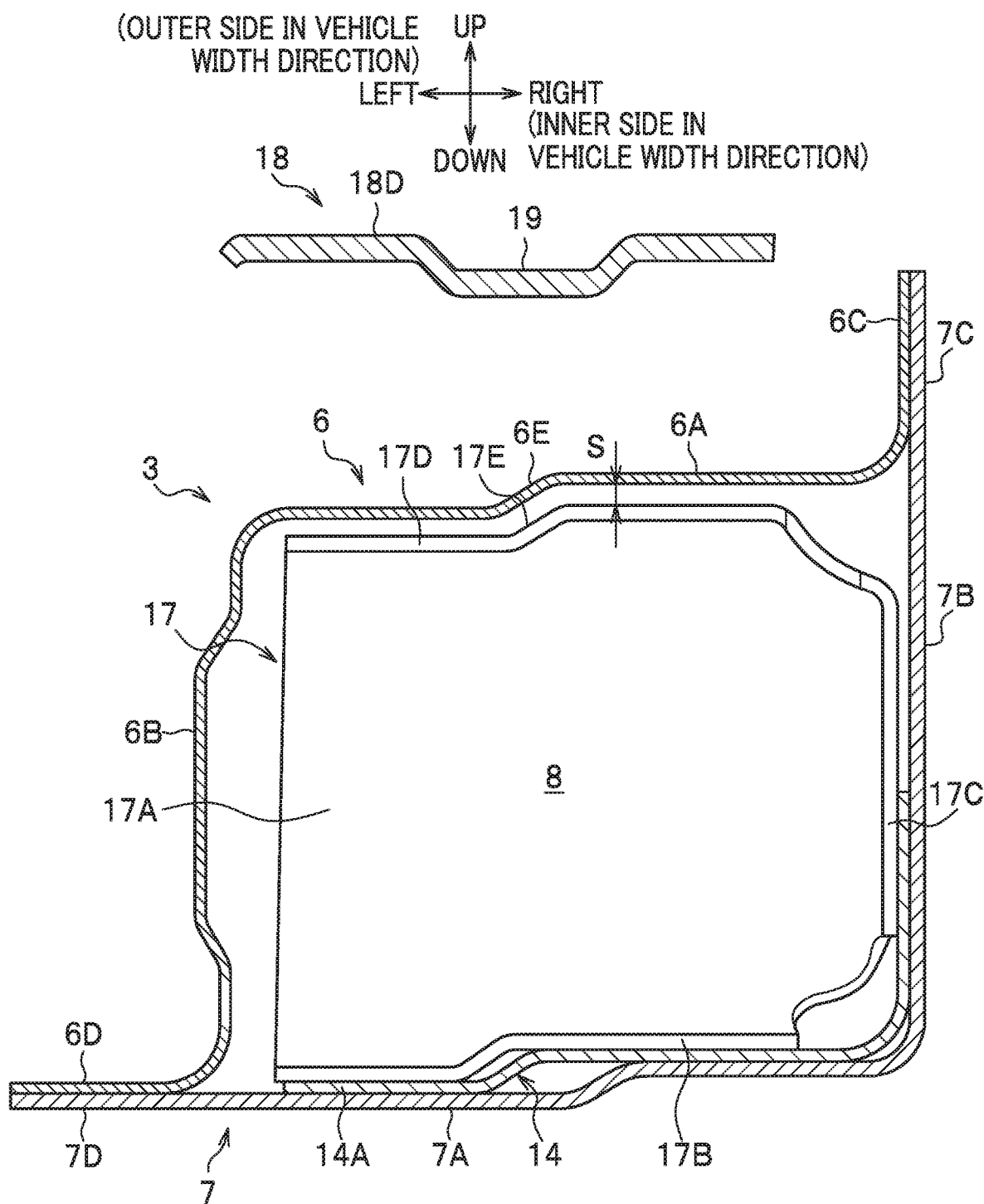

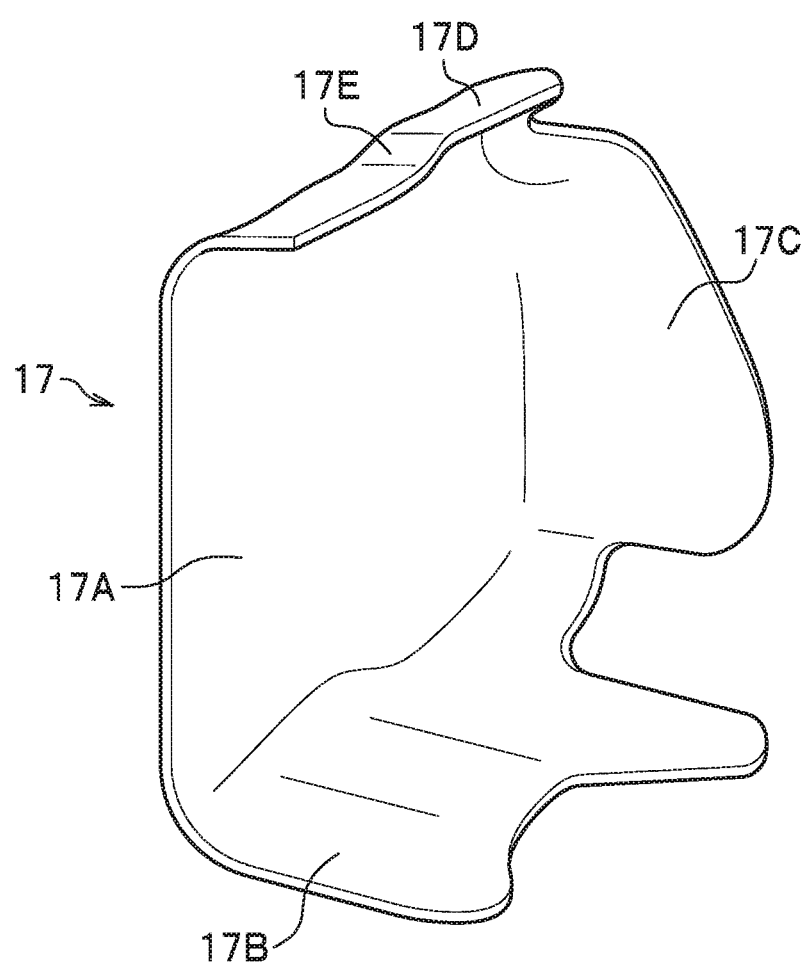

VEHICLE FRONT STRUCTURE

BACKGROUND OF THE INVENTION

1. Field of the Invention

The present invention relates to a vehicle front structure of an automobile and the like.

2. Description of the Related Art

Patent Literature 1 discloses a conventional technique of a side frame which extends in a vehicle front-rear direction with a rear end joined to a front pillar, and with a front end joined to a vehicle front component. Patent Literature 1 discloses an upper member whose front end is joined to a head lamp bracket.

PRIOR ART DOCUMENT(S)

Patent Literature(s)

Patent Literature 1: JP 5640934 B

SUMMARY OF THE INVENTION

It is well known that an upper member extending horizontally from a front pillar is bent downward at a middle thereof to form a lower member extending frontward and downward; and the lower member is connected to a vehicle front component. An object of the present invention is to provide a vehicle front structure which include a bent side frame, is deformed stably when collision load is applied, and stably absorb impact energy by the deformation.

In order to achieve the above object, the present invention provides a vehicle front structure. A side frame is arranged outward of a front side frame in a vehicle width direction. The side frame includes an upper member, and a lower member connected to a front end of the upper member and extending frontward and downward. A bent part bent frontward and upward is formed in a connection part between the upper member and the lower member. A bulkhead is provided frontward of the upper bent part so as to separate a closed cross section part of the lower member.

According to the present invention, a vehicle front structure can be deformed stably by a simple structure at the time of vehicle collision.

BRIEF DESCRIPTION OF THE DRAWINGS

FIG. 3 is a cross-sectional view of the vehicle front structure taken along the line A-A in FIG. 1;

FIG. 4 is a perspective view of a bulkhead;

DETAILED DESCRIPTION OF THE EMBODIMENTS

Figure 1:
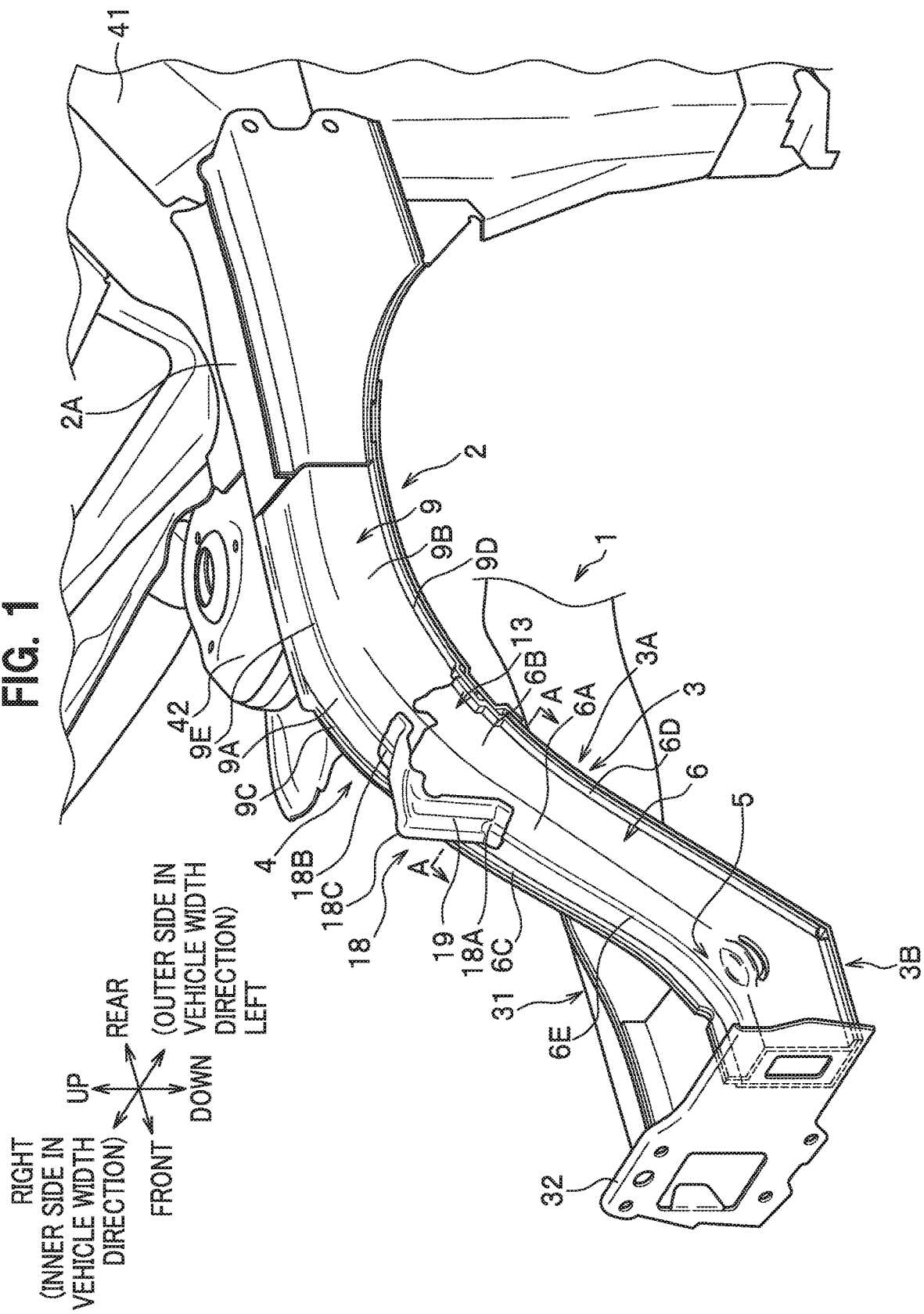
FIG. 1 is a perspective view of a vehicle front structure according to an embodiment of the present invention.

In FIG. 1, a side frame 1 is arranged outward of a front side frame 31 in a vehicle width direction. The front side frame 31 extends approximately horizontally in a vehicle front-rear direction. The side frame 1 and the front side frame 31 are arranged on right and left sides of the vehicle in the vehicle width direction as a pair. FIG. 1 shows the side frame 1 and the front side frame 31 which are arranged on the left side of the vehicle. The following descriptions will be provided for the side frame 1 arranged on the left side of the vehicle. The side frame 1 arranged on the right side of the vehicle, however, has the same structure as the side frame 1 arranged on the left side of the vehicle, except that their shapes are left-right symmetrical with each other.

(Side Frame 1)

The side frame 1 includes: a wheel house upper member (hereinafter, referred to as an "upper member") 2 located above a front wheel (not shown), and extending approximately horizontally in the vehicle front-rear direction with a rear end of the upper member 2 connected to a front pillar 41; and a wheel house lower member (hereinafter, referred to as a "lower member") 3 connected to a front end of the upper member 2, and extending frontward and downward. The upper member 2 includes: a front upper member which is a front half of the upper member 2; and a rear upper member 2A joined to a rear end of the front upper member by spot-welding or the like, and extending backward with a rear end of the rear upper member 2A connected to the front pillar 41. A dumper base 42 covering a dumper (not shown) from above is arranged inward of the rear upper member 2A in the vehicle width direction. In the following descriptions, the upper member 2 means the front upper member.

(Lower Member 3)

The lower member 3 includes: an inclined straight part 3A extending frontward and downward approximately straight from a connection part between the lower member 3 and the upper member 2; and a lower horizontal straight part 3B continuing from a lower end of the inclined straight part 3A via a lower bent part 5, and extending horizontally forward by a slight amount. The lower bent part 5 is formed in the shape of the letter U while opening frontward and upward. A front end of the lower horizontal straight part 3B approximately coincides with a front end of the front side frame 31 with respect to positions in up-down and front-rear directions. The front end of the lower horizontal straight part 3B and the front end of the front side frame 31 are linked together using a gusset 32.

The lower member 3 includes an outer panel 6 and an inner panel 7. As shown in FIG. 3, the outer panel 6 includes: an upper surface 6A extending horizontally in the vehicle width direction; an outer side surface 6B extending vertically downward from an outer end of the upper surface 6A in the vehicle width direction; an upper flange 6C made of an upward-facing flange extending vertically upward from an inner end of the upper surface 6A in the vehicle width direction; and a lower flange 6D made of a laterally-facing flange extending horizontally outward in the vehicle width direction from a lower end of the outer side surface 6B. The upper surface 6A includes a ridge line (step part) 6E which is formed in an approximately central portion thereof in the vehicle width direction. The upper surface 6A is located slightly lower in its vehicle width direction outer portion outside the ridge line 6E than in its vehicle width direction inner portion inside the ridge line 6E.

(Upper Member 12)

The inner panel 7 includes: a lower surface 7A extending horizontally in the vehicle width direction; an inner side surface 7B extending approximately vertically upward from an inner end of the lower surface 7A in the vehicle width direction; an upper flange 7C made of an upward-facing flange extending vertically upward from an upper end of the inner side surface 7B; and a lower flange 7D made of a laterally-facing flange extending horizontally outward in the vehicle width direction from an outer end of the lower surface 7A in the vehicle width direction. The upper flanges 6C, 7C are joined together by spot-welding or the like, while the lower flanges 6D, 7D are joined together by spot-welding or the like. Thereby, the upper surface 6A and the lower surface 7A face each other in the up-down direction, while the outer side surface 6B and the inner side surface 7B face each other in the left-right direction. Thus, a rectangular closed cross section part 8 which is a hollow cross section part is formed inside the lower member 3.

(Upper Member 2)

Figure 2:
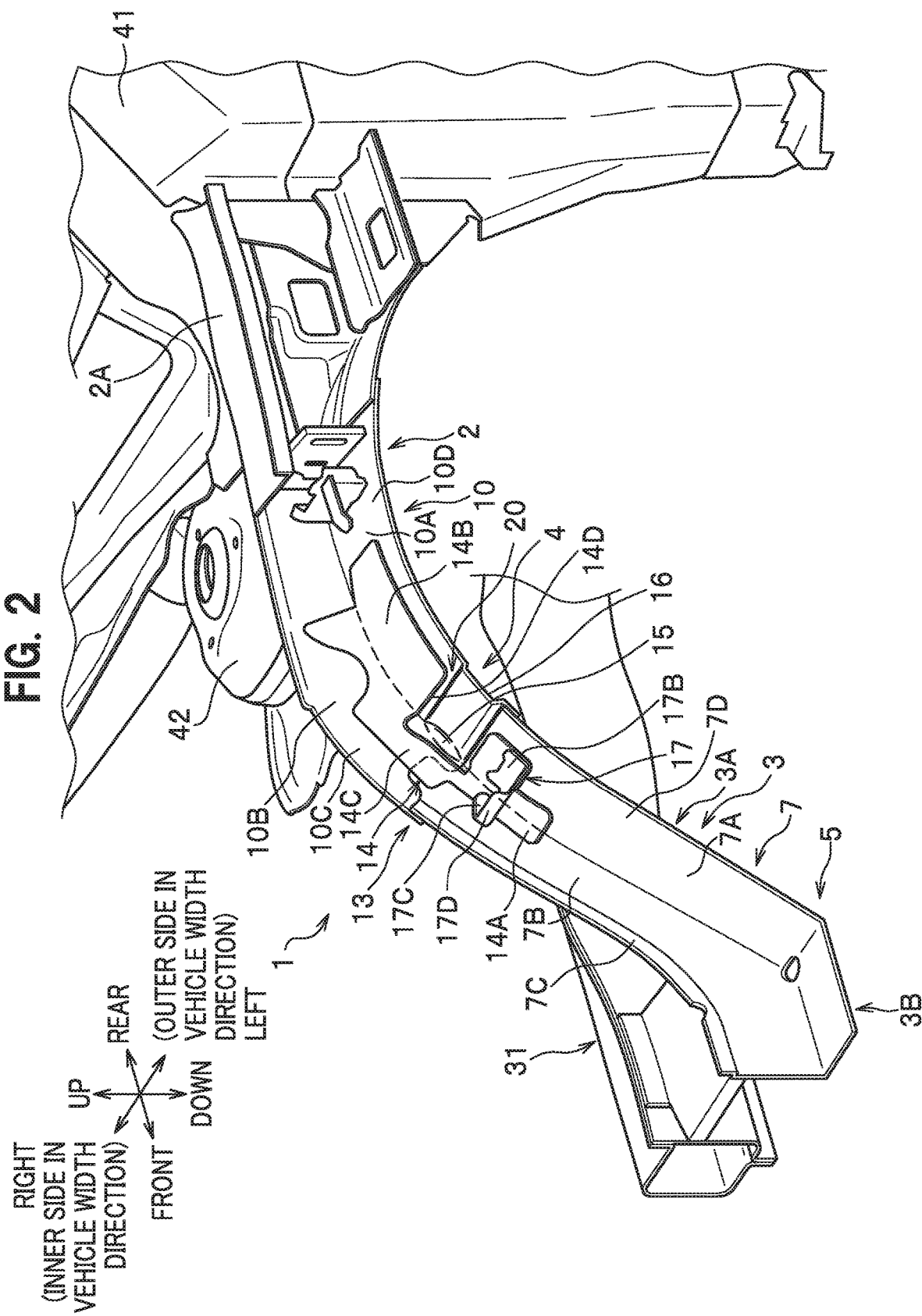
FIG. 2 is a perspective view of the vehicle front structure with an outer panel removed from a side frame.

In FIGS. 1 and 2, like the lower member 3, the upper member 2 includes an outer panel 9 and an inner panel 10. The outer panel 9 includes: an upper surface 9A extending horizontally in the vehicle width direction; an outer side surface 9B extending vertically downward from an outer end of the upper surface 9A in the vehicle width direction; an upper flange 9C formed along an inner end of the upper surface 9A in the vehicle width direction; and a lower flange 9D formed along a lower end of the outer side surface 9B. A ridge line 9E continuing to the ridge line 6E is formed on the upper surface 9A.

As shown in FIG. 2, the inner panel 10 includes: a lower surface 10A extending approximately horizontally in the vehicle width direction; an inner side surface 10B extending approximately vertically upward from an inner end of the lower surface 10A in the vehicle width direction; an upper flange 10C formed along an upper end of the inner side surface 10B; and a lower flange 10D formed along an outer end of the lower surface 10A in the vehicle width direction. The upper flanges 9C, 10C are joined together by spot-welding or the like, while the lower flanges 9D, 10D are joined together by spot-welding or the like. Thereby, the upper surface 9A and the lower surface 10A face each other in the up-down direction, while the outer side surface 9B and the inner side surface 10B face each other in the left-right direction. Thus, a rectangular closed cross section part which is a hollow cross section part is formed inside the upper member 2.

Figure 5A:
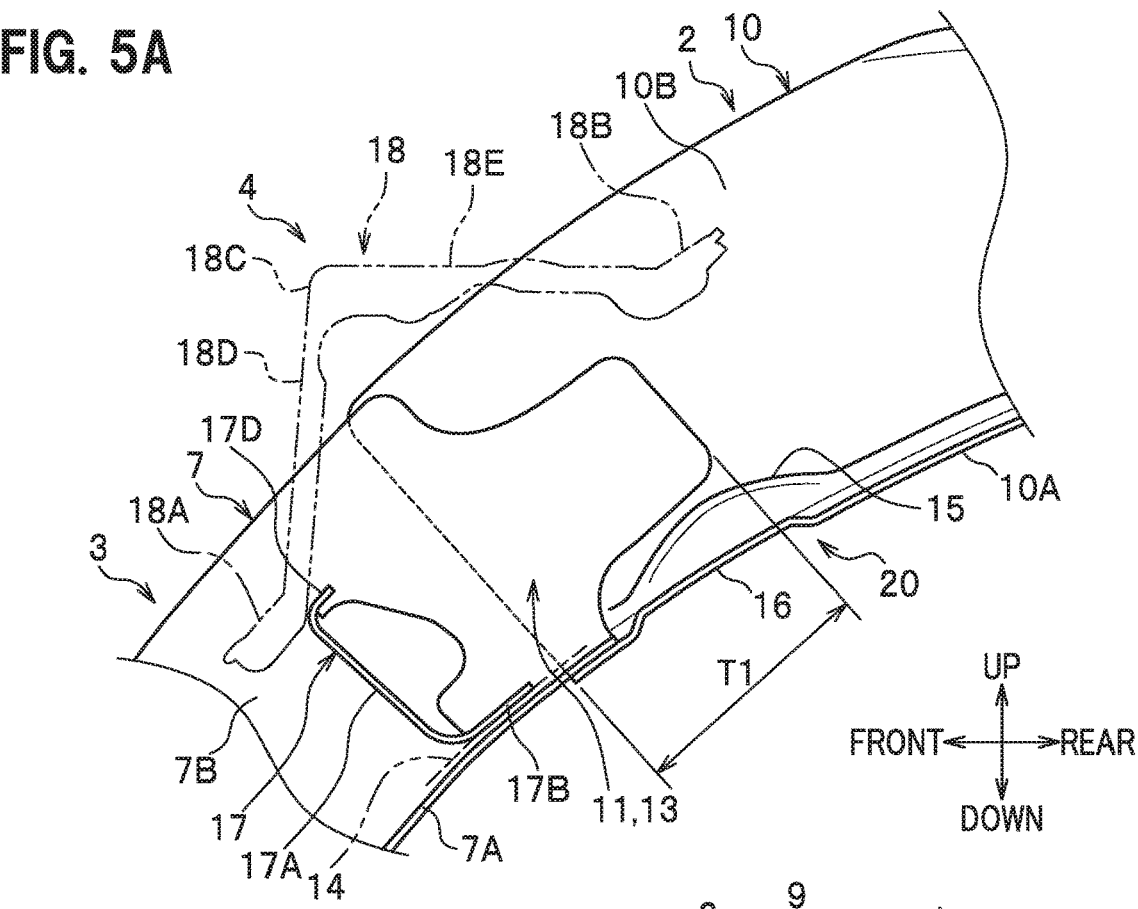
FIG. 5A is a side view of a connection part between an inner panel of a lower member and an inner panel of an upper member, as well as its surroundings.
Figure 5B:
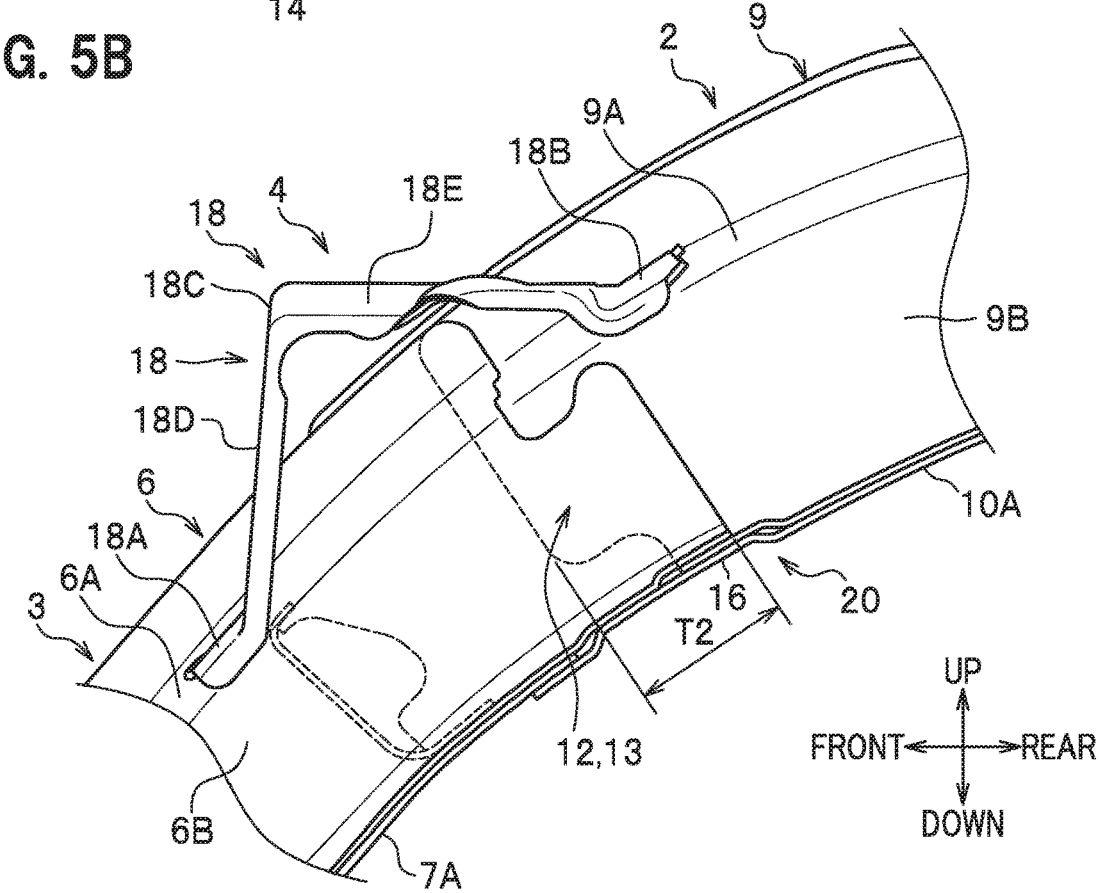
FIG. 5B is a side view of a connection part between an outer panel of the lower member and an outer panel of the upper member, as well as its surroundings.

The upper member 2 and the lower member 3 are joined together by spot-welding or the like with a front end of the upper member 2 and a rear end of the lower member 3 overlapping each other. More specifically, the inner panel 10 and the inner panel 7 are arranged such that the inner panel 10 overlaps the inner panel 7 from under and from an inner side in the vehicle width direction, while the outer panel 6 overlaps the outer panel 9 from above and from an outer side in the vehicle width direction. In FIG. 5A, reference signal T1 denotes an overlap margin of a connection part 11 where the inner panels 7, 10 overlap each other. The connection part 11 is set such that an overlap margin of an overlap between the inner side surfaces 7B, 10B is larger than an overlap margin of an overlap between the lower surfaces 7A, 10A. In FIG. 5B, reference signal T2 denotes an overlap margin of a connection part 12 where the outer panels 6, 9 overlap each other. The connection part 12 is set such that an overlap margin of an overlap between the outer side surfaces 6B, 9B is larger than an overlap margin of an overlap between the upper surfaces 6A, 9A.

The front end of the upper member 2 is formed curving frontward and downward. The rear end of the lower member 3 is similarly formed curving slightly so as to smoothly continue to the front end of the upper member 2. Thereby, an upper bent part 4 bent upward is formed in a connection part 13 (that is to say, the connection part 11 and the connection part 12) between the upper member 2 and the lower member 3.

(Stiffener 14)

As shown in FIG. 2, a stiffener 14 is joined to the inner panels 7, 10 by spot-welding or the like. The stiffener 14 is a reinforcement member extending across the connection part 13 in an extending direction of the lower member 3. The stiffener 14 has an approximately L-shaped cross section. That is, the stiffener 14 is bent approximately orthogonally along the lower surfaces 7A, 10A and the inner side surfaces 7B, 10B. More specifically, the stiffener 14 includes: a front rigidity part 14A attached to the lower surface 7A and the inner side surface 7B in a place further forward than the connection part 11; a rear rigidity part 14B attached to the lower surface 10A and the inner side surface 10B in a place further backward than the connection part 11; and a link part 14C which is attached to the inner side surface 7B in the connection part 11, and which links the front rigidity part 14A and the rear rigidity part 14B.

Behind the connection part 11, a recessed part 15 is formed in a corner portion between the lower surface 10A and the inner side surface 10B of the upper member 2. The recessed part 15 works as a fragile part 20 which induces buckling deformation of the upper bent part 4 when collision load is applied from the front. The recessed part 15 is a depression formed to set back toward the inside of the closed cross section part of the upper member 2. A cut part 14D is formed in the stiffener 14. The cut part 14D avoids interference between the stiffener 14 and the recessed part 15 which thrusts into the closed cross section part. The cut part 14D also plays the function of the fragile part 20 which induces buckling deformation of the upper bent part 4. Furthermore, a bead 16 is formed in a part of the lower surface 10A which is at the immediate side of the recessed part 15. The bead 16 projects upward into the closed cross section part, and extends in the vehicle width direction. The bead 16 also plays the function of the fragile part 20 which induces buckling deformation of the upper bent part 4. These fragile parts 20 are provided under a rear end part 18B of a fender support bracket 18, which will be described later.

(Bulkhead 17)

A bulkhead 17 for reinforcement purpose is provided ahead of the upper bent part 4. The bulkhead 17 separates the closed cross section part 8 of the lower member 3 into parts in the extending direction of the lower member 3. Referring to FIGS. 3 and 4, the bulkhead 17 is formed along a plane approximately orthogonal to the extending direction of the inclined straight part 3A, and includes a rectangular partition plate part 17A whose shape is approximately the same as that of the closed cross section part 8. A lower flange 17B, aside flange 17C, and an upper flange 17D are formed in a lower end, an inner end in the vehicle width direction, and an upper end of the partition plate part 17A, respectively. The lower flange 17B, the side flange 17C and the upper flange 17D extend toward the connection part 13 in the extending direction of the lower member 3.

In FIG. 3, together with the front rigidity part 14A of the stiffener 14, the lower flange 17B is joined to the lower surface 7A of the lower member 3 by spot-welding or the like. Together with the front rigidity part 14A, the side flange 17C is joined to the inner side surface 7B of the lower member 3 by spot-welding or the like. In this embodiment, the upper flange 17D is located facing the upper surface 6A of the lower member 3 with a slight space S of approximately 3 mm interposed between the upper flange 17D and the supper surface 6A. Corresponding to the ridge line 6E of the upper surface 6A, a ridge line 17E is formed in the upper flange 17D with the space S kept constant. Incidentally, depending on cases, the upper flange 17D may be joined to the upper surface 6A by welding or the like.

(Fender Support Bracket (Bracket Member) 18)

Referring to FIGS. 1, 5A, 5B and 6, the fender support bracket 18 is provided on the upper bent part 4 such that: a front end part 18A of the fender support bracket 18 is located near an upper part of the bulkhead 17, and is joined to the upper surface 6A of the lower member 3 by spot-welding or the like; a rear end part 18B of the fender support bracket 18 is joined to the upper surface 9A of the upper member 2 by spot-welding or the like; and the fender support bracket 18 includes a protrusion part 18C projecting frontward and upward. In other words, the fender support bracket 18 stretches across the connection part 13 between the upper surface 6A of the lower member 3 and the upper surface 9A of the upper member 2. The fender support bracket 18 supports a front fender (not shown) of the vehicle body. The protrusion part 18C includes: a front surface 18D which is a surface extending in the vehicle width direction, and approximately vertically upward from the front end part 18A; and an upper surface 18E which is a surface extending in the vehicle width direction, and approximately horizontally forward from the rear end part 18B. As learned from FIG. 5, the front end part 18A is located slightly ahead of the upper flange 17D of the bulkhead 17 in the extending direction of the lower member 3, but not in a way that overlaps the upper flange 17D. The front end part 18A is connected to the upper surface 6A.

Figure 6:
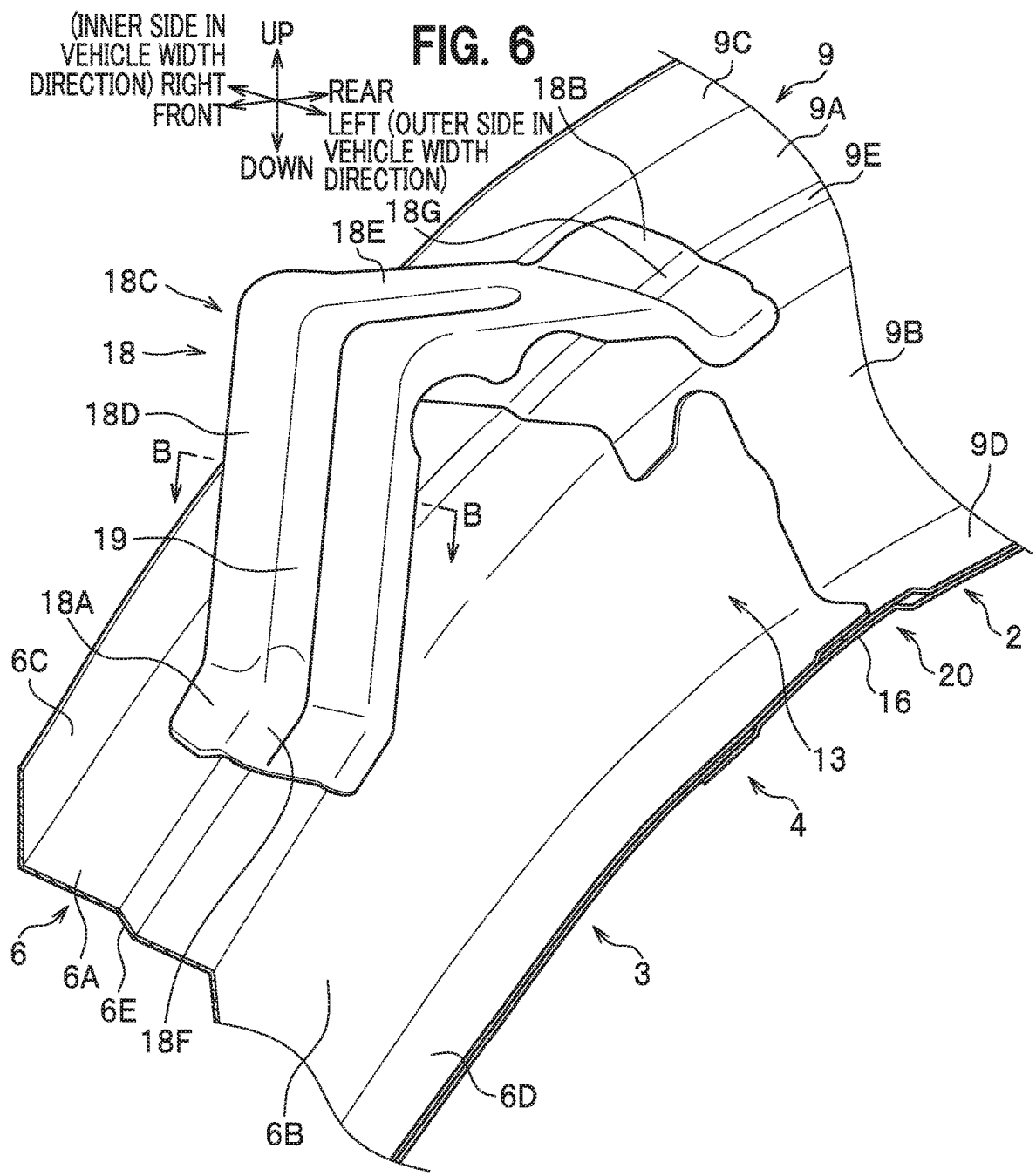
FIG. 6 is a perspective view of a fender support bracket.
Figure 7:
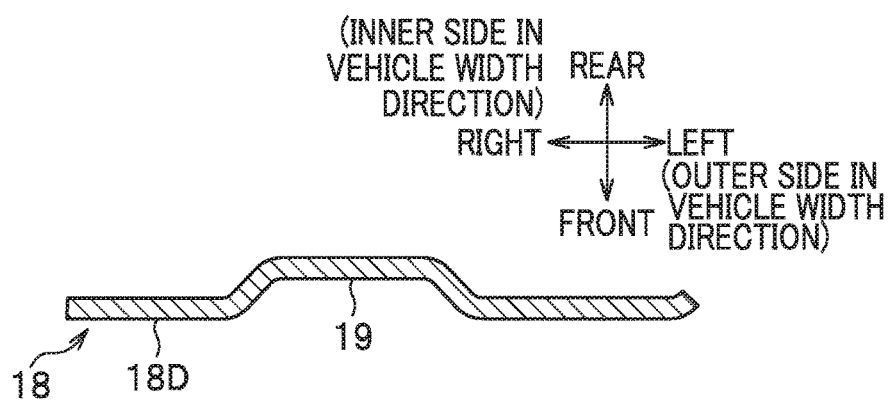
FIG. 7 is a cross-sectional view of the fender support bracket taken along the line B-B in FIG. 6.

In FIG. 6, corresponding to the ridge line 6E, a ridge line 18F is formed in the front end part 18A in order to make the front end part 18A in surface contact with the upper surface 6A across the ridge line 6E. In addition, corresponding to the ridge line 9E, a ridge line 18G is formed in the rear end part 18B in order to make the rear end part 18B in surface contact with the upper surface 9A across the ridge line 9E. A bead 19 is formed along a center portion of the front surface 18D in the vehicle width direction. The bead part 19 extends in the up-down direction to the front end part 18A, and is shaped like a shallow groove. As shown in FIG. 7, the bead part 19 is formed projecting backward. As shown in FIG. 6, an upper end side of the bead 19 is formed to extend into a middle of the upper surface 18E without stopping within the front surface 18D.

(Effect)

When collision load is applied to the side frame 1 from the front, the side frame 1 is folded along the lower bent part 5 and the upper bent part 4 both serving as folding points, and the inclined straight part 3A stands up forward. That is to say, a so-called Z-shaped folding buckling deformation occurs in the side frame 1. The impact energy is absorbed by the deformation.

In this respect, the connection part 13 is arranged in the upper bent part 4. The connection part 13 is an overlap part of the upper member 2 and the lower member 3. Since the connection part 13 has high rigidity because of its increased thickness, the folding point in the upper bent part 4 tends to avoid the connection part 13, and to appear forward or backward of the connection part 13. Through analysis, the present inventor has found that the folding point backward of the connection part 13 makes it possible to fold the upper bent part 4 more gently while keeping the upper member 2 and the lower member 3 connected together in the connection part 13, and to make the impact energy absorption efficiency better. There are, however, case where it is difficult to stably fold the upper bent part 4 backward of the connection part 13 because of various factors, such as the lengths of the upper member 2 and the lower member 3, balance between the folding mode of the upper bent part 4 and the folding mode of the front side frame 31, as well as behaviors of engine parts.

To solve this problem, the present invention provides the bulkhead 17 frontward of the connection part 13. The bulkhead 17 separates the closed cross section part 8 of the lower member 3 into parts in the extending direction of the lower member 3. As a result, the bulkhead 17 prevents the closed cross section part 8 from deforming. That is, the bulkhead 17 prevents the upper surface 6A and the lower surface 7A in the lower member 3 from coming closer to each other.

As discussed above, the side frame 1 is arranged outward of the front side frame 31 in the vehicle width direction; the side frame 1 includes the upper member 2, and the lower member 3 connected to the front end of the upper member 2 and extending frontward and downward; the upper bent part 4 bent frontward and upward is formed in the connection part 13 between the upper member 2 and the lower member 3; and the bulkhead 17 is provided frontward of the upper bent part 4 so as to separate the closed cross section part 8 of the lower member 3. It is possible, therefore, to inhibit the upper bent part 4 from being folded frontward of the connection part 13. It is accordingly possible to stably fold the upper bent part 4 backward of the connection part 13, which is the desirable folding part.

Particularly, the bulkhead 17 has the configuration in which the upper flange 17D extending in the extending direction of the lower member 3 is formed in the upper part of the bulkhead 17. As a surface, the upper flange 17D can stop the upper surface 6A from deforming toward the lower surface 7A when collision load is received. In the embodiment, meanwhile, the space S is provided between the upper flange 17D and the upper surface 6A. After the upper surface 6A moves downward by the space S to hit the upper flange 17D, the upper flange 17 stops the upper surface 6A from deforming downward. This makes it possible to effectively stop the deformation of the upper surface 6A, and to more securely inhibit the upper bent part 4 from being folded frontward of the connection part 13.

Furthermore, the fender support bracket (bracket member) 18 is arranged on the upper bent part 4 such that: the front end part 18A is located near the upper part of the bulkhead 17; the rear end part 18B is connected to the upper surface 9A of the upper member 2; and the fender support bracket 18 includes the protrusion part 18C projecting frontward and upward. This brings about the following effects. Since the fender support bracket 18 connects the upper surface 6A of the lower member 3 and the upper surface 9A of the upper member 2, strength of the connection between the lower member 3 and the upper member 2 in normal time can be enhanced. In addition, since the front end part 18A is joined to the upper surface 6A of the lower member 3 near the upper part of the bulkhead 17, the upper end part 18A and the upper end of the bulkhead 17 collaborate to stop the upper surface 6A from being folded. This makes it possible to more securely inhibit the upper bent part 4 from being folded frontward of the connection part 13.

The fragile parts 20 in the upper member 2 are provided under the fender support bracket 18, and stress can be concentrated on the fragile parts 20. Thus, the upper bent part 4 can be securely folded backward of the connection part 13. The arrangement of the fragile parts 20 under the fender support bracket 18 makes it possible to inhibit a decrease in the rigidity of the side frame 1.

The bead 19 extending toward the front end part 18A in the up-down direction is provided to the protrusion part 18C of the fender support bracket 18, and the strength of the fender support bracket 18 can be effectively enhanced. This makes it possible to enhance the strength of the connection between the upper member 2 and the lower member 3, and to inhibit unexpected deformation of the upper member 2 and the lower member 3.

The foregoing descriptions have been provided for the preferable embodiment of the present invention. Although in the embodiment, the bulkhead 17 is joined to the inner panel 7 by spot-welding, the bulkhead 17 may be joined to the outer panel 6 by spot-welding depending on cases. Otherwise, the bulkhead 17 may be joined to both the inner panel 7 and the outer panel 6 by spot-welding.

What is claimed is:

1. A vehicle front structure, comprising:
    a front side frame; and
    a side frame arranged outward of the front side frame in a vehicle width direction, wherein
    the side frame includes
        an upper member, and
        a lower member, a rear end of the lower member is connected to a front end of the upper member, and the lower member extending frontward and downward in a vehicle front-rear direction,
    a bent part bent frontward and upward is formed in a connection part between the upper member and the lower member, and
    a bulkhead is provided frontward of the bent part so as to separate a closed cross section part of the lower member.

2. The vehicle front structure according to claim 1, wherein an upper flange extending in an extending direction of the lower member is formed in an upper part of the bulkhead.

3. The vehicle front structure according to claim 1, further comprising a bracket member which is arranged on the bent part such that
    a front end part of the bracket member is located near the upper part of the bulkhead,
    a rear end part of the bracket member is connected to an upper surface of the upper member, and
    the bracket member includes a protrusion part projecting frontward and upward.

4. The vehicle front structure according to claim 3, wherein a fragile part of the upper member is provided under the bracket member.

5. The vehicle front structure according to claim 3, wherein a bead extending toward the front end part in an up-down direction is provided to the protrusion part of the bracket member.

6. The vehicle front structure according to claim 1, wherein a lower end of the bulkhead is joined to a lower surface of the lower member, and an upper member of the bulkhead is a free end located facing an upper surface of the lower member with a space therebetween.

\* \* \* \* \*